United States Patent [19]

Skupsky et al.

[11] Patent Number: 5,263,039
[45] Date of Patent: Nov. 16, 1993

[54] SYSTEM FOR GENERATING SHAPED OPTICAL PULSES AND MEASURING OPTICAL PULSES USING SPECTRAL BEAM DEFLECTION (SBD)

[75] Inventors: Stanley Skupsky; Terrance J. Kessler, both of Rochester; Samuel A. Letzring, Honeoye Falls, all of N.Y.

[73] Assignee: The University of Rochester, Rochester, N.Y.

[21] Appl. No.: 885,438

[22] Filed: May 18, 1992

[51] Int. Cl.[5] .............................................. H01S 3/10
[52] U.S. Cl. ..................................... 372/25; 372/102; 372/101; 372/103; 372/26; 372/31
[58] Field of Search ................... 372/29, 26, 25, 102, 372/103, 101, 31

[56] References Cited

U.S. PATENT DOCUMENTS 5,048,029 9/1991 Skupsky et al. .................... 372/26
5,095,487 3/1992 Meyerhofer et al. ................ 372/25

OTHER PUBLICATIONS

S. C. Burkhart, et al., IEEE Transaction, Microwave Theory Tech, vol. 38 pp. 1514–1518 (1990).
IAEA Technical Committee Mtg. on Drivers for Inertial Confinement Fusion (Osoka, Japan, Apr. 15–19, 1991) 21 pp.

*Primary Examiner*—Léon Scott, Jr.
*Attorney, Agent, or Firm*—M. Lukacher

[57] ABSTRACT

A temporally shaped or modified optical output pulse is generated from a bandwidth-encoded optical input pulse in a system in which the input pulse is in the form of a beam which is spectrally spread into components contained within the bandwidth, followed by deflection of the spectrally spread beam (SBD) thereby spatially mapping the components in correspondence with the temporal input pulse profile in the focal plane of a lens, and by spatially selective attenuation of selected components in that focal plane. The shaped or modified optical output pulse is then reconstructed from the attenuated spectral components. The pulse-shaping system is particularly useful for generating optical pulses of selected temporal shape over a wide range of pulse duration, such pulses finding application in the fields of optical communication, optical recording and data storage, atomic and molecular spectroscopy and laser fusion. An optical streak camera is also provided which uses SBD to display the beam intensity in the focal plane as a function of time during the input pulse.

36 Claims, 5 Drawing Sheets

SYSTEM FOR GENERATING SHAPED OPTICAL PULSES AND MEASURING OPTICAL PULSES USING SPECTRAL BEAM DEFLECTION (SBD)

The U.S. Government has rights in this invention Pursuant to Contract DE-FC03-85DP40200 between the University of Rochester and the Department of Energy, Office of Inertial Confinement Fusion.

The present invention relates to improved systems for shaping and measuring optical pulses using spectral beam deflection (SBD). SBD relates each point in time during a pulse to a unique characteristic spectral frequency and a deflection angle corresponding to the spectral frequency. The invention provides a system for generating a temporally shaped or modified output optical pulse derived from a bandwidth-encoded input optical pulse from a pulsed laser source. More particularly, the invention provides a system for generating such temporally shaped or modified output optical pulse from a bandwidth-encoded input pulse whose temporal intensity profile is correspondingly mapped spatially in the focal plane of a lens and is shaped or modified by spatially selective attenuation in that focal plane so as to provide a temporally shaped or modified output optical pulse upon reconstruction. The invention also relates to a system for measuring a pulse in accordance with the magnitude of the deflection of a spectrally encoded beam which corresponds to the pulse.

The invention is especially useful for generating laser pulses having selectable temporal intensity profile or shape; such temporally shaped laser pulses being suitable for applications in laser beam scanners for reading and writing on optical recording and data storage, media, and also in optical communication, atomic and molecular spectroscopy and for laser fusion.

Laser-beam temporal pulse shaping of an input pulse in the time domain has been disclosed in an article by S.C. Burkhart, et al. appearing in IEEE Transaction, Microwave Theory Tech., Volume 38, page 1514 (1990), and also in an article by M. Haner, et al. appearing in Applied Physics Letters, Volume 52, page 1458 (1988). In time-domain pulse shaping, the laser input pulse is passed through a Pockels cell placed between two polarizing elements. Application of a temporally shaped electrical pulse to the Pockels cell causes a time-dependent attenuation of the input laser pulse. This system or optical pulse shaping, relying on electrical techniques for constructing the required temporal shape of the electrical drive pulse to be imposed on the Pockels cell, has limited capability to achieve optical pulses of various desired temporal intensity profiles or of pulses with relatively fast rising intensity profiles.

Another technique for laser-beam temporal pulse shaping has been proposed by A.M. Weiner, et al. in an article appearing in the Journal of the Optical Society of America, section B, volume 5, page 1563 (1988), and references therein. This technique, referred to as laser beam pulse shaping in the frequency domain, employs a diffraction grating for spatially separating the spectral components of a laser input pulse, modifying the amplitude or the phase, or both, of these spectral components to produce the optical spectrum corresponding to the desired output pulse shape. The spectral components are then recombined to achieve the desired pulse. This approach, while in principle capable or producing varied temporal pulse shapes, has only been found useful in generating relatively simple optical pulse shapes, due largely to the high level of precision required in modifying both the amplitude and phase of each spectral component.

Pulse shaping by laser beam deflection using electro-optically active prisms has been examined in a presentation by A.A. Mak, et al., published in the proceedings of the IAEA Technical Committee Meeting on Drivers for Inertial Confinement Fusion (Osaka, Japan, April 15-19, 1991). Electro-optic prisms require well-controlled and reproducible electrical drive pulses as well as a high degree of uniformity across the optically active surface of the electro-optic prism. These requirements are difficult to attain when electro-optic prism type beam deflectors are used with laser beams of relatively large diameter (1-3 centimeters) and may need several prisms in order to achieve adequate beam deflection.

It is, therefore, the principal object of the present invention to provide an improved optical system using spectral beam deflection (SBD) for the generation of temporally shaped output pulses.

Another object of the invention is to provide an improved optical system for shaping a laser pulse, which is also applicable for measuring the temporal shape of a laser pulse, in which a bandwidth-encoded input laser pulse beam is deflected in accordance with its wavelength (spectral beam deflection) to spatially separate or spread the pulse as a function of its spectral components, then selectively attenuating the spread spectral components of the pulse in the focal plane of a lens, and then the attenuated components are reconstructed to provide an output pulse of desired temporal shape.

It is another object of this invention to provide an improved system for generating and measuring optical pulses using SBD which enables bandwidth-encoded laser input optical pulses covering a wide range of pulse duration to provide output pulse durations as may be desired for particular pulsed laser applications or to be displayed as the input pulse occurs as in a streak camera.

Briefly described, the invention provides a temporally shaped or modified output pulse which is generated by spectral beam deflection prior to and following spatially selective attenuation of an input pulse in the focal plane of a first lens. An optical, preferably laser, beam corresponding to the input pulse is bandwidth-encoded so that its spectral components (contained within the pulse's bandwidth) are dispersed or spread in correspondence with the temporal behavior of the input pulse. The system thus uses means for generating a bandwidth-encoded input laser pulse beam. Means are provided for deflecting the encoded pulse beam to spatially disperse or spread the spectral components contained within the bandwidth of the input pulse. The beam may be displayed providing a measurement of the input pulse in terms of its deflection in the focal plane of the lens for pulse shaping. For generating a shaped pulse, means are provided for attenuating, in a spatially selective manner and in the focal plane of a first lens, selected spectral components of the deflected pulse beam. Means are then provided for deflection of the spatially, selectively attenuated beam to reconstruct the beam into the shaped or modified output pulse. Such spectral beam deflection removes the remaining spectral dispersion, so as to obtain a desired temporal intensity profile of the output pulse.

The foregoing and other objects, features and advantages of the invention, as well as presently preferred embodiments thereof, will become more apparent from reading the following description in conjunction with the accompanying drawings in which:

FIGS. 3A-D are graphs accompanying FIG. 3;

Figure 1:
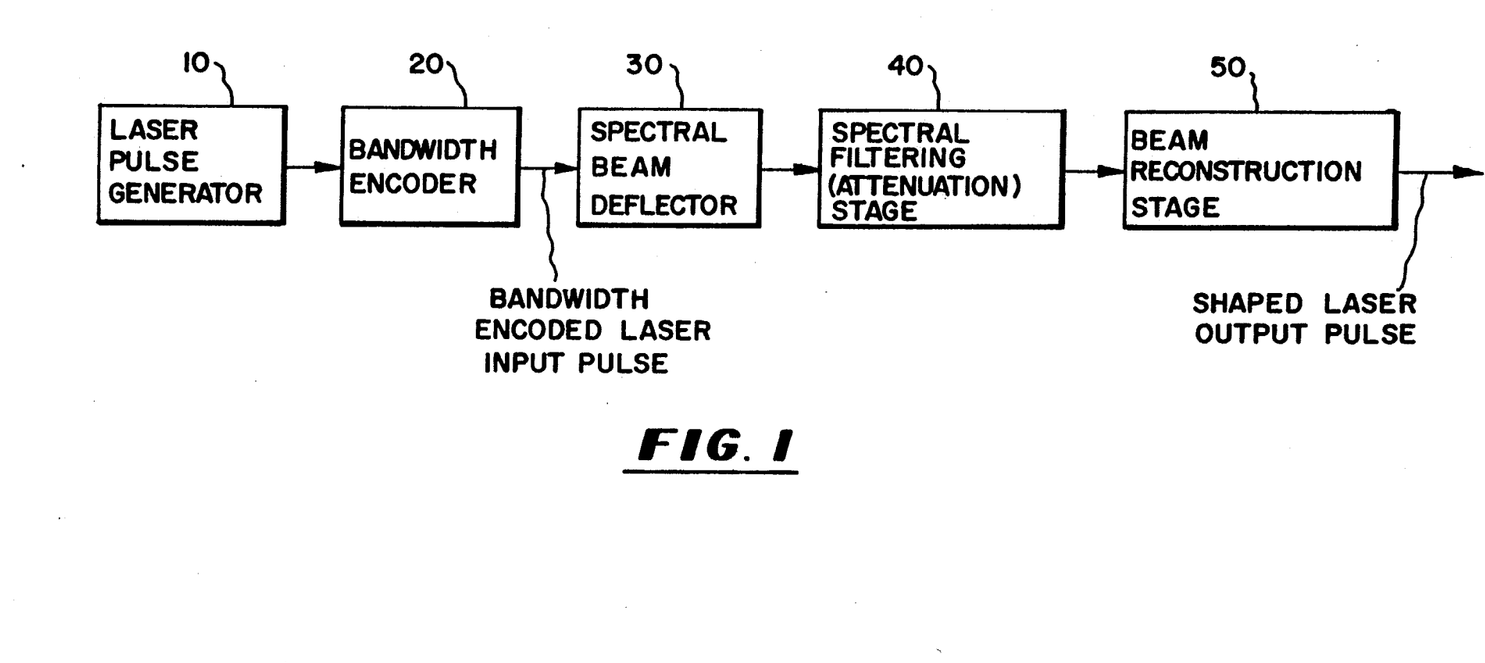
FIG. 1 is a block diagram of a bandwidth-encoded pulsed laser beam pulse shaping system embodying the invention.

Referring more particularly to the drawings, there is shown in FIG. 1 a laser pulse generator 10 which provides a single pulse or a multiplicity of successive pulses serving as input to bandwidth encoder 20. The pulse generator may be a mode-locked laser oscillator of the Nd:YAG type with a wavelength of about 10,000 Angstroms. Bandwidth encoder 20 provides phase modulation (or frequency modulation) to laser pulses emanating from generator 10 in a manner such that the instantaneous frequency (the time derivative of the phase) changes monotonically with time during the duration of each pulse, thereby assigning to each point in time during the pulse a corresponding and characteristic spectral frequency. Bandwidth encoding of the laser pulse or pulses can be accomplished with a planar electro-optic modulator which is driven by electrical signals of suitable temporal behavior. Alternatively, the laser pulse or pulses can be bandwidth-encoded by chirping the pulse in passing through a suitably coupled optical fiber (for example, a fiber of 800 meters in length), in which the pulse from the generator experiences self phase modulation, thereby acquiring bandwidth. The generator and bandwidth encoder may be similar to the generator (oscillator) and chirper or electro-optic phase modulator shown in U.S. Pat. Nos. 5,048,487 of 10 Sept. 91 and 5,095,487 of 10 Mar. 92.

Bandwidth-encoding (phase or frequency modulation) provides a bandwidth sufficient to ensure desired temporal resolution of the pulse to be obtained at the system's output as a shaped pulse. The bandwidth of the encoded pulse can be in a range of from about 1-30 Angstrom units, and is preferably in a range of 2-20 Angstrom units.

Spectral beam deflection stage 30 uses passive optical elements (see FIGS. 2 and 3 and the discussion thereof below) for effecting spectral beam deflection of the bandwidth-encoded pulse, so as to provide across the entrance surface (aperture) of a lens (42 or 46), in a subsequent spectral filtering stage 40, spectrally dispersed components of the pulse in correspondence with the temporal intensity profile of the pulse. A spectrally deflecting optical element which may be used in the stage 30 is an optical diffraction grating (32 or 34) of the reflective or transmissive type. A suitable periodicity for the grating is approximately 1700 lines per millimeter. A mirror 36 may be used to direct the spectrally dispersed pulse toward the filtering stage 40.

Spectral filtering stage 40 provides for spatially selective, and thereby for spectrally selective attenuation of the spectral (wavelength) components of the spectrally dispersed pulse beam in the focal plane 44 or 48 of the lens 42 or 46, which is called herein a first lens. In the focal plane of the first lens, the position of the focal point of the pulse changes in time as the beam is deflected, thereby creating a one-to-one mapping or correspondence between time during the pulse and spatial position in the focal plane. Spatially selective intensity attenuation in the focal plane of the lens then produces attenuation in the corresponding temporal behavior of the pulse when the pulsed beam is returned to a far-field position in a beam reconstruction stage 50.

Beam reconstruction stage 50 comprises a second lens 52 and a second diffraction grating 56 which provides spectral beam deflection in a sense opposite to the deflection in the stage 30. The second lens 52 recollimates the beam exiting from the spectral filtering (selective spectral or attenuation) stage 40 and the second grating 56 removes the spectral dispersion which was originally imposed by the first grating in spectral beam deflection stage 30 which remains after spectral filtering in the stage 40. A second mirror 54 may be used between the second lens 52 and the second grating 56 to direct the pulsed beam towards that grating 56.

A temporally shaped output laser pulse is thus obtained, derived from spectral beam deflection of a bandwidth-encoded input pulse followed by spatially selective filtering of said spectrally deflected and spatially spread pulsed beam components in the focal plane of a lens and subsequent reconstruction of those remaining spectral components transmitted by the spatial filtering stage.

Figure 2:
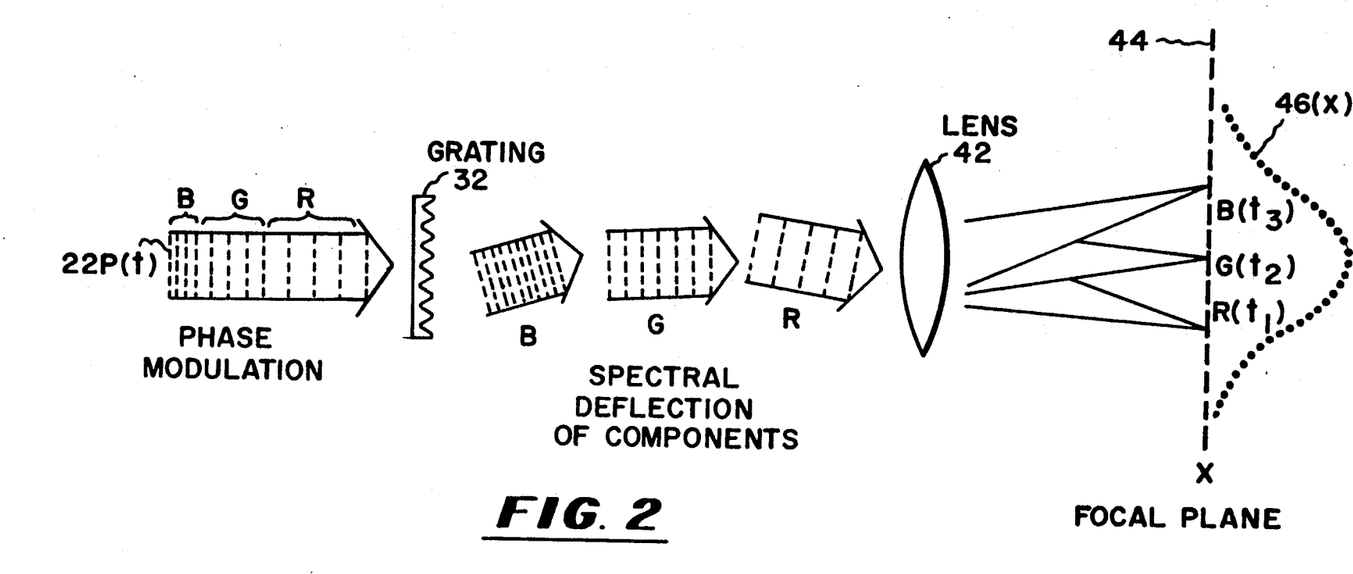
FIG. 2 is a diagram schematically showing the portion of the system of FIG. 1 which provides spectral beam deflection (SBD) of a bandwidth-encoded pulsed laser beam to provide a mapping of the beam's temporal variation into a corresponding spatial variation in the focal plane of a lens.
Figure 2A:
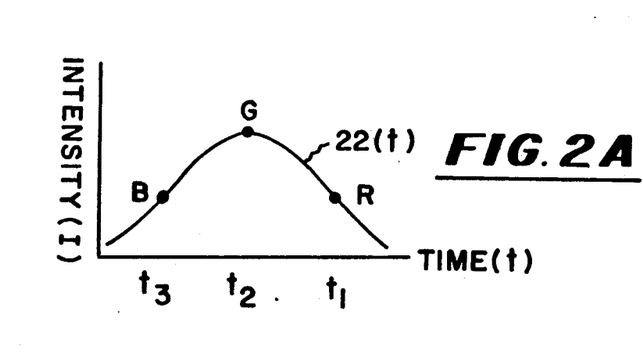
FIG 2A is a graph accompanying FIG. 2.

Referring more particularly to FIG. 2 and FIG. 2A, the spectral beam deflection of a bandwidth-encoded pulsed laser beam, followed by spatial mapping of the temporal behavior of the pulse in the focal plane of a lens, is shown in greater detail than in FIG. 1. The temporal behavior (intensity versus time) of the encoded laser pulse 22(t) is, for purposes of simplifying the drawing, characterized as having intensity B (for blue) at time $t_3$, approximate peak intensity G (for green) at time $t_2$ and intensity R (for red) at time $t_1$. A bandwidth-encoded portion of pulse 22 is drawn as a phase-modulated beam 22P(t), shown to propagate toward a transmission grating 32. The phase modulation is indicated as three sets of dashed parallel lines in beam 22P(t), lines within each set of dashed lines being drawn to be spaced equally from one another and the sets of lines intended to represent a monotonic phase change (and monotonic frequency change) corresponding to the temporal behavior of laser pulse 22(t). The spectral components are in a monotonic continuum in the system.

Transmissive grating 32 diffracts, and thereby deflects by differing angles with respect to the direction of propagation of incident pulsed beam 22P(t), the differently modulated (spectral) components of beam 22P(t). In other words, during the duration of pulse 22P(t), components B, G and R of bandwidth-encoded pulse 22P(t) will be deflected time-sequentially and by differing angles by grating 32.

Deflected beam components B, G and R are shown propagating toward the entrance surface of a lens 42 having a spatial focal plane 44, shown at a dashed line X. In the focal plane 44, differently deflected pulsed beam components B, G and R appear time-sequentially within the duration of pulse 22(t), as spatially spread and focused renditions B(t$_3$), G(t$_2$) and R(t$_1$), whose aggregate spatial intensity profile in the focal plane is indicated by dotted line 46(X).

Referring now, more particularly to FIG. 3 and FIGS. 3A–D there are shown the presently preferred means for: bandwidth-encoding an input laser pulse; for spreading the spectral components of the pulse spatially; for processing the spectral components individually in the focal plane of a lens; and for recombining the processed components to reconstruct them into an output laser pulse of desired shape.

Figure 3:
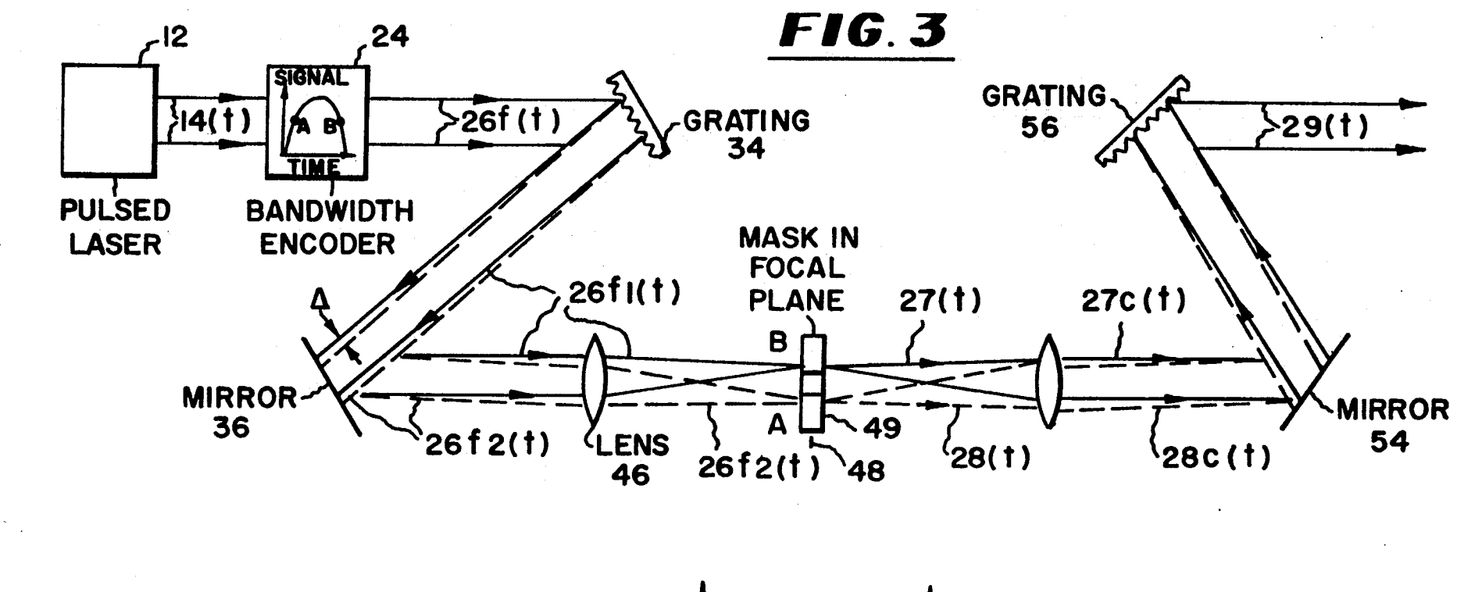
FIG. 3 is a schematic diagram of the optics of the system of FIG. 1, in accordance with the presently preferred embodiment of the invention.
Figure 3A:
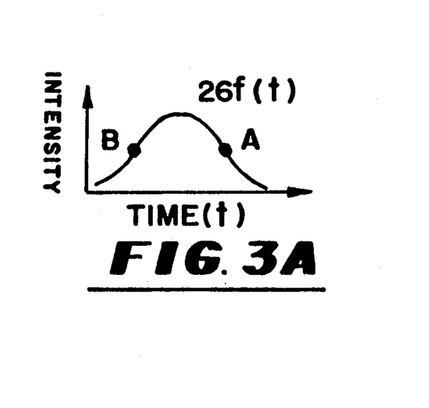
Figure 3B:
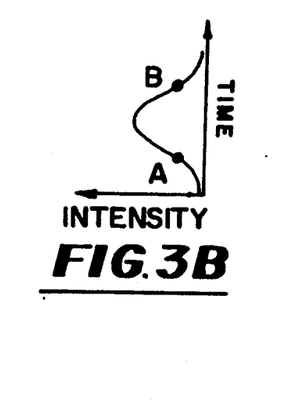
Figure 3C:
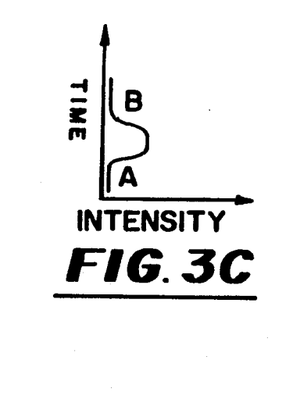
Figure 3D:
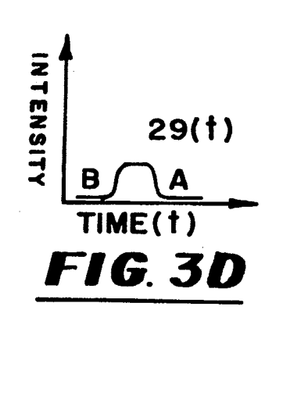

A pulsed laser 12 which can be a pulsed Nd:YAG laser, as described above, generates a pulsed beam 14(t) whose intensity (amplitude) is a function of time (t). This pulse can be from approximately 50 picoseconds to approximately 5 nanoseconds in duration. Pulse 14(t) is directed at and through a bandwidth encoder 24, as described above, which serves to phase (or frequency) modulate the pulse in such a manner that the frequency (or phase) modulation changes monotonically throughout the duration of pulse 14(t). Bandwidth encoding can be accomplished by using electrically active optical devices referred to as electro-optic modulators, and it can also be achieved by chirping the pulse from the laser through passage in an optical fiber (for example an 800 meters long fiber), whereby the pulse undergoes self phase modulation. Bandwidth encoders of both types are described in the above-referenced patents.

The bandwidth-encoded pulse 26f(t) is directed at reflective diffraction grating 34 where angular variation of the spectral components takes place. The angular variation leads to a spatial separation of the spectral components. Such angular variation of the spectral components is an important feature of the invention. Two such spectral components, 26f1(t) and 26f2(t), are shown as being directed toward mirror 36 and again toward the entrance surface (aperture) of lens 46. Spectrally selective deflection of laser beam 26f(t) by diffraction grating 34 is indicated as the spatial difference (displacement) Δ between spectral beam components 26f1(t) and 26f2(t) in proximity to the plane of mirror 36.

Figure 4:
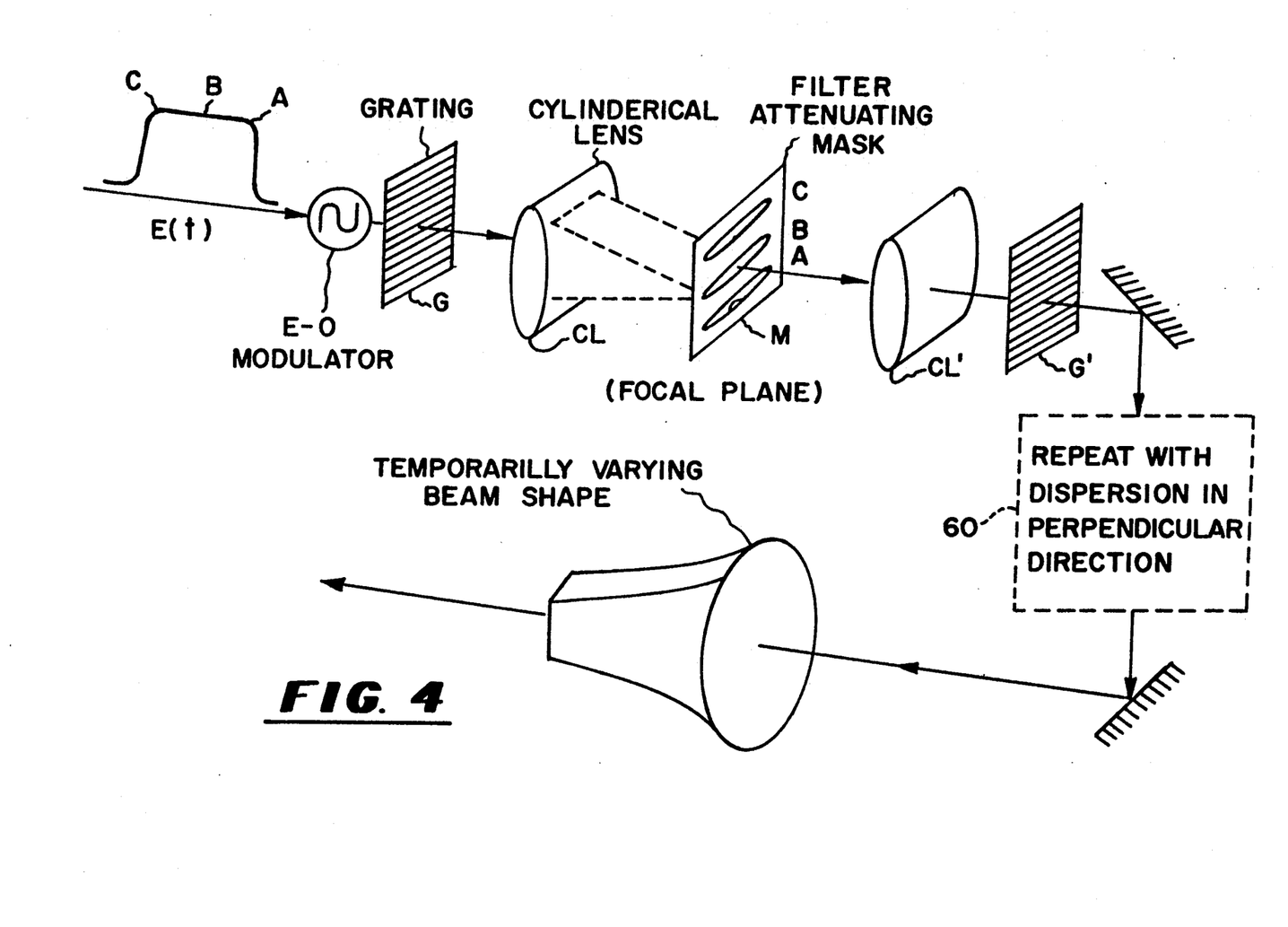
FIG. 4 is a schematic diagram of another embodiment of the invention.

Lens 46 focuses the angularly spread spectral components of the laser pulse onto spatially selectively, transmitting amplitude attenuation mask 49 positioned coextensively in the focal plane or mapping plane 48 of lens 46. Mask 49 can be constructed as a substantially two-dimensional, optically passive element having predetermined regions or zones of differing attenuation propensity (transmissivity). For example, such regions or zones can have transmittance values varying from full (100%) transmittance through partial transmittance to full opacity at desired spatial positions, to spatially selectively attenuate the respective spectral components of the pulsed beam in the focal plane. A particular amplitude attenuation mask has particular and permanent substantially two-dimensionally arranged patterns of varying transmittance, sp as to transmit particular spatial fractions of the spectral components of pulsed beams 26f1(t) and 26f2(t) incident on the mask in the focal plane of lens 46. See e.g., the mark in FIG. 4. Since the temporal behavior of beam 26f(t) is mapped spatially in the focal plane of lens 46, spatially selective attenuation of spectral components of the beam by mask 49 results in transmission of modified or shaped pulsed beam components 27(t) and 28(t) toward collimating lens 52. Mask 49 extends spatially in the focal plane so as to intersect substantially all spread spectral components of the laser input pulse.

Mask 49 can also be constructed as an optically active element having an area array of adjacent electrically addressable polarization-inducing liquid crystal elements used in conjunction with a polarization analyzer which is fixedly positioned with respect to the array on the side facing away from lens 46. By proper selection of electrical drive signals levels associated with each liquid crystal element of the two-dimensional array of elements, a temporally stationary pattern of polarizing propensity is established by these elements prior to initiating pulsed laser 12. Polarizing propensity is related to the level of applied electrical signal. Used in conjunction with the polarizing analyzer element, the substantially two-dimensional liquid crystal array functions as a programmable amplitude attenuator in the focal plane of lens 46, thereby permitting attainment of varied spatial patterns of selected transmittance for incident spectral beam components 26f1(t) and 26f2(t) by electrically addressing selected elements with programmable electrical signals.

Three major parameters affect the temporal resolution of a shaped or modified laser pulse in the pulse shaping system according to the present invention: (a) the angular dispersion Γ of grating 34, that is the propensity of the grating to spectrally separate and spatially spread the components of the encoded laser beam 26f(t); (b) the magnitude of the encoded wavelength bandwidth Δλ of pulsed beam 26f(t), and (c) the diameter D of the input laser pulse 14(t). One aspect determining the temporal resolution of the shaped or modified laser pulse is the focal spot sized relative to the spatial deflection, S, (spatial spread) of the beam in the focal plane 48 of lens 46. With a wavelength λ of laser pulse beam 14(t) and a focal length F of lens 46, the focal spot size d can be approximated by $$d = 2.4 F \lambda / D \qquad (1)$$

for a substantially diffraction-limited pulsed beam. The magnitude of the spatial beam deflection S in the focal plane 48 of lens 46 is given by $$S = F \Gamma \Delta \lambda \qquad (2)$$

Thus, the number of resolution points achievable in the focal plane 48 of lens 46 is approximately equal to $$S/d = 0.4 \Gamma D \Delta \lambda / \lambda \qquad (3)$$

For values of Γ = 500 microradians/Angstrom unit, for the angular dispersion of grating 34, a laser beam diameter D = 5 centimeters, a wavelength-equivalent bandwidth Δλ = 5 Angstrom units of the bandwidth-encoded pulsed beam 26f(t) and a laser wavelength λ of 10,000 Angstrom units, the number of resolution points in the focal plane 48 of lens 46 is computed to be approximately 50.

Lens 52 serves as means to recollimate modified pulsed beam components 27(t) and 28(t) which have undergone spatially selective amplitude attenuation in mask 49. Recollimated pulsed beams 27c(t) and 28c(t) are directed toward mirror 54 and by mirror 54 toward reflective diffraction grating 56. Grating 56 is substantially identical to grating 34, having a periodicity of approximately 1700 lines per millimeter. Grating 56 provides spectral beam deflection in a sense opposite to the grating 34 and recombines the spectral components.

The grating 56 effectively removes remaining spectral dispersion from collimated modified pulsed beam components 27c(t) and 28c(t) and provides diffracted collimated output pulsed beam 29(t) having modified temporal pulse shape compared to bandwidth-encoded input pulsed beam 26f(t).

In the event that only a fraction of the encoded bandwidth of the input pulse 26f(t) is required for shaping a desired output pulse 29(t), the output pulse, although collimated and free of spectral dispersion, will contain residual bandwidth in the form of phase or frequency modulation. Such residual bandwidth can be removed from output pulse 29(t) by passing that pulse through a second electro-optic modulator (not shown) operating at the same frequency and modulation index as the initial bandwidth-encoding electro-optic modulator 24 but at a phase shift of 180 degrees with respect to modulator 24.

The spectral beam deflection and pulse shaping system of the invention is also useful in applications where a chirped (bandwidth-encoded) laser input pulse is first temporally stretched by a double-grating arrangement, followed by spectral beam deflection and pulse shaping of the stretched pulse. For example, a chirped laser pulse of about 100 picoseconds duration can be stretched to a duration of approximately 5 nanoseconds by a double-grating arrangement, while retaining substantially the same temporal intensity profile (for example a Guassian profile). Likewise, a 100 picosecond chirped pulse can be compressed to a duration of approximately 0.1 picoseconds by a double-grating arrangement. Such stretched or compressed laser pulses, may be derived from a chirped (bandwidth-encoded) original laser pulse, and can then be used as the bandwidth-encoded input pulses to the spectral beam deflection and pulse shaping system described above, thereby providing a substantially broadened temporal range (from sub-picoseconds to nanoseconds) over which laser pulses can be temporally shaped or modified in the system of the invention.

The spectral beam deflection, spatially selective attenuation of spectral beam components in the focal plane of a lens by a substantially two-dimensional selective attenuator, and reconstruction of a shaped laser beam were shown as affecting the laser pulse processing in a one-dimensional manner has been presented in order to explain the principles of the invention. This one-dimensional technique is useful for applications that require variation of only the beam intensity during the pulse. The present invention is also useful in applications requiring variation of the beam size during the pulse, in addition to intensity. The beam size can be changed in each one of two orthogonal dimensions, for example in an X-dimension or direction and in a Y-dimension or direction.

In two-dimensional pulse shaping (see FIG. 4), a bandwidth-encoded laser input pulse beam E(t) is first spectral encoded to provide dispersed spectral components by an E-0 modulator, and spatially spread into spectral components by a first diffraction grating G whose lines of periodicity are oriented in a first direction (for example an X-direction). Optical mapping of said first direction spectrally spread components now takes place in the focal plane of a first cylindrical lens CL whose central axis is parallel to said first direction of the first grating G (for example the X-direction). A mask M having a predetermined two-dimensional attenuation pattern in the focal plane of said first cylindrical lens selectively attenuates spatially mapped components of said first direction. Reconstruction of a first modified or shaped output pulse (shaped or modified in the X-direction) takes place by a second cylindrical lens CL' whose central axis is parallel to the central axis of the first cylindrical lens. That lens CL' serves to recollimate the modified pulsed beam and to position it on a second diffraction grating G', which second grating has lines of periodicity parallel to the lines of the first grating. This second grating removes from the X-direction-shaped pulsed beam the spectral dispersion (combines spectral components) imposed on the pulse by the first grating. The block 60 represents a repetition of the elements G, CL, M, CL' and G' oriented for providing and processing dispersion in a transverse (e.g. perpendicular or Y) direction. The X-direction-shaped pulsed beam, still bandwidth-encoded, is in block 60 directed at a third diffraction grating whose lines of periodicity are oriented in a second direction (for example a Y-direction) orthogonal (perpendicular) to the first direction. Spectral dispersion and spatial spreading by that third grating, focal plane mapping by a third cylindrical lens with central axis parallel to the Y-direction, spatially selective masking in the focal plane of that third cylindrical lens provide Y-direction shaped pulsed beam components which are then reconstructed (spectral components combined) to form an output pulse by a fourth cylindrical lens oriented with its central axis in the Y-direction and by a fourth diffraction grating to remove the spectral dispersion imposed on the pulsed beam by the third Y-direction diffraction grating.

Thus, a laser output pulse shaped from an input pulse in two orthogonal (perpendicular) directions during its duration is provided by the laser pulse shaping system of the present invention by first shaping a bandwidth-encoded laser input pulse in one direction (for example the X-direction), followed by shaping the X-direction-shaped pulse without additional bandwidth-encoding in an orthogonal direction (for example the Y-direction). This two-dimensional beam shaping is particularly useful in applications requiring two-dimensional beam shaping, including beam sizing, as a function of elapsed time during the duration of the bandwidth-encoded laser input pulse.

Measurement of an optical pulse (i.e. the time history of the pulse) can be accomplished by placing a photosensitive device such as film in the focal plane 44 (FIG. 2) where the beam has been deflected and is spatially displayed. However, if the one-to-one relationship between time during the pulse and spatial position in the focal place is absent, the system shown in FIG. 5 may be used. Then, first and second pairs 70 and 72 of gratings with E-O modulators 74 and 76 therebetween accomplish two goals: (1) any frequency bandwidth $\Delta\nu_O$ on the beam prior to the first grating pair 70 will not contribute to the beam deflection and (2) the modulators 74 and 76 are not required to be synchronized with the peak of the pulse E (t). The lines of the grating pair 70 and the lines of the grating pair 72 are perpendicular. For pre-existing bandwidth, the first grating 70a of the first pair 70 will disperse the bandwidth $\Delta\nu_O$ in the x-direction; the second grating 70b of the first pair 70 will remove that dispersion. Similarly, the first grating of the second pair 72 (i.e., the third grating 72a) will disperse the beam in the y-direction in accordance with $\Delta\nu_O$, but the fourth grating 72b will remove the dispersion. Only bandwidth imposed by the modulators 74 and 76 will be dispersed.

Figure 5:
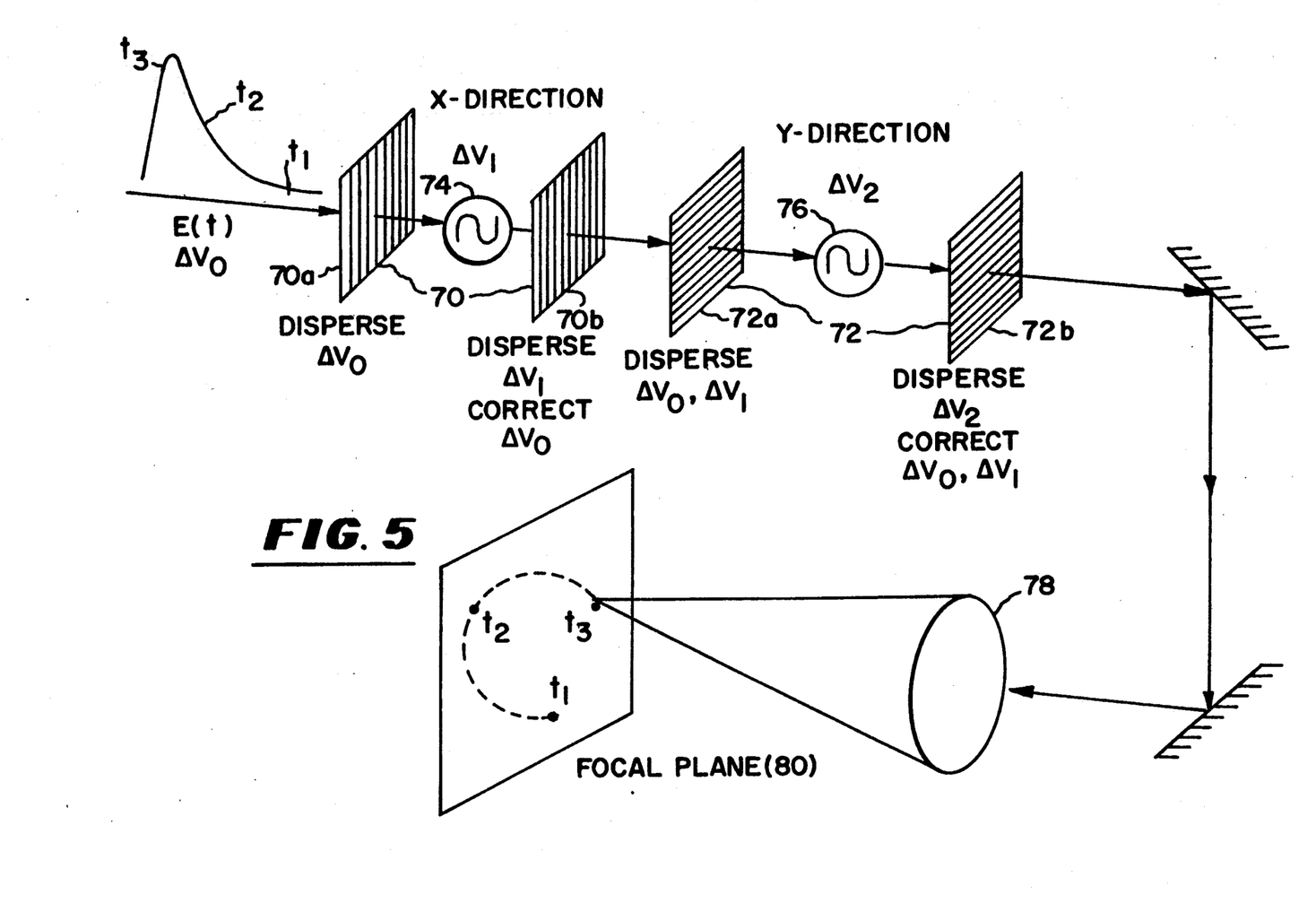
FIG. 5 is a schematic diagram of an optical streak camera using SBD.

Bandwidth imposed by the first modulator 74 will be dispersed in the x-direction by the second grating 70b, and then in the y-direction by the third grating 72a. But the y-direction dispersion is removed by the fourth grating 72b, leaving this bandwidth dispersed only in the x-direction. Bandwidth imposed by the second modulator 74 will be dispersed only in the y-direction by the fourth grating 72b. Thus, when the beam is focused by lens 78 in the focal plane 80, it will trace out a pattern that includes deflection in both the x and y directions, determined only by the bandwidth from the two E-O modulators 74 and 76. For sinusoidal modulation, the beam will be deflected in a circle in the focal plane if the two bandwidths and modulation frequencies are equal, and if the relative phase differs by 90°. In general, any Lissajous pattern can be created.

The relative phase between the bandwidth imposed by the two modulators will vary across the beam due to time delays introduced by the second and fourth gratings. Thus, different parts of the beam can trace different patterns in the focal plane, and there will not be a unique "streak" for the entire beam. This effect can be small if the grating delay time is small compared to the modulation time of the bandwith. Otherwise, it will be necessary to pass the beam through an aperture to isolate a portion of the beam for which the phase difference between the bandwidths is relatively constant.

It is not necessary to synchronize the modulators 74 and 76 with respect to the peak of the pulse. The only constraint is that the modulation time should be longer than the pulse width so that the pulse will be displayed before the trace repeats itself. The position of the pulse in the focal plane will depend on the phase of the peak of the pulse, but it will not affect measurement of the beam's intensity variation (and the profile of the pulse E(t)) as a function of time.

From the foregoing description it will be apparent that there has been provided improved laser pulse measuring and shaping systems using SBD. Variations and modifications of the herein described systems, and other applications of SBD within the scope of the invention, will undoubtedly suggest themselves to those skilled in the art; for example, scanners for reading and writing optically encoded digital or analog signals and for precision illumination of selected zones of an object. Accordingly, the foregoing description is to be taken as illustrative and not in a limiting sense.

We claim:

1. A system for characterizing an optical pulse with an intensity and a duration, said system comprising, means for encoding said pulse into a beam having spectral frequency components, the components corresponding to the intensity of said pulse at successive points in time during the duration of said pulse, first spectral beam deflection means for angularly varying said beam from said means for encoding and spatially separating said frequency components thereof, means for focusing said spatially spread frequency components from said first spectral beam deflection means in a focal plane for representing said pulse as a function of intensity of said beam versus time at different locations in said plane.

2. The system according to claim 1 further comprising means for spectrally filtering said components in said plane, and second spectral beam deflecting means for reconstructing said beam into an output optical pulse having a profile which is a function of the filtering thereof by said filtering means.

3. The system according to claim 1 further comprising means, operative on said optical pulse before encoding thereof by said encoding means, for dispersing said beam and said beam deflection means comprises means for correcting said beam dispersed by said dispersing means and angularly varying said beam to spatially separate the spectral components introduced by said encoding means, and means in said focal plane for measuring said beam in accordance with the intensity of said beam at said different locations.

4. The system according to claim 3 wherein said dispersing means and said deflection means each comprise a grating, with said encoding means disposed between said gratings.

5. The system according to claim 4 further comprising a second pair of gratings having second encoding means therebetween, said first pair of gratings and said second pair of grating having lines, said lines of said first and second pairs being transverse to each other, said first and second grating pairs and said encoding means therebetween being disposed along a path along which said beam extends to said focal plane, and the first said second pair of gratings upon which said beam is incident providing dispersion which compensates for the bandwidth of said pulse.

6. A laser pulse shaping system which provides an output pulse of certain temporal intensity profile, which system comprises means for generating a bandwidth-encoded laser beam having spectral components within a certain bandwidth and a varying intensity, spectral beam deflection means for spatially spreading the spectral components contained within the bandwidth of said bandwidth-encoded laser beam pulse, means for spatially selectively attenuating the spatially spread components provided by said deflection means to vary the intensity thereof, and means for reconstructing from the components, provided by said attenuating means said output pulse of said certain temporal intensity profile.

7. The laser pulse shaping system according to claim 6 further comprising means for applying said laser beam to said generating means as an incident input pulse having a certain intensity profile over a certain duration and a certain phase, and wherein said bandwidth-encoding means includes means for providing a monotonic relationship between the encoded phase change and time during the furation of the incident input laser pulse.

8. The laser pulse shaping system according to claim 7 wherein said monotonic relationship providing means is a planar input electro-optic modulator driven by an electrical signal with a substantially monotonically changing signal level during the duration of the incident laser pulse.

9. The laser pulse shaping system according to claim 6 wherein said deflection means for spatially spreading said spectral components includes a reflection diffraction grating.

10. The laser pulse shaping system according to claim 6 wherein said deflection means includes a mirror.

11. The laser pulse shaping system according to claim 10 wherein said deflection means includes a lens.

12. The laser pulse shaping system according to claim 6 further comprising means for mapping said spectral components provided by said deflection means in a plane.

13. The laser pulse shaping means according to claim 12 wherein said mapping means comprises a lens having a focal plane which defines said plane wherein said components are mapped.

14. The laser pulse shaping system according to claim 12 wherein said means for spatially selectively attenuating selected components of said mapping comprises an optical mask having a substantially two-dimensional predetermined pattern comprising zones or regions of differing levels of attenuation and being coextensive with said optical mapping plane.

15. The laser pulse shaping system according to claim 14 wherein said laser beam is in the form of an input pulse and said substantially two-dimensional pattern extends spatially in said mapping plane so as to intersect substantially all spread spectral components of said laser input pulse.

16. The laser pulse shaping system according to claim 6 wherein said third means for spatially selectively attenuating selected components includes a substantially two-dimensional array of adjacent polarization-inducing elements, each of said elements providing a level of polarization induction in response to an applied electrical signal level, and a polarization analyzer fixedly positioned with respect to the two-dimensional array on the side of the array facing away from the optical mapping means.

17. The laser pulse shaping system according to claim 16 wherein said two-dimensional array of polarization-inducing elements is an electrically addressable liquid crystal array.

18. The laser pulse shaping system according to claim 6 wherein said second reconstructing means comprises second spectral beam deflection means.

19. The laser pulse shaping system according to claim 18 wherein said second deflection means comprises a second grating.

20. The laser pulse shaping system according to claim 19 wherein said second deflection means also includes a second lens and means defining an optical path between said lens and said grating.

21. The laser pulse shaping system according to claim 6 wherein said reconstructing means includes a first output electro-optic modulator which is driven by an electrical signal with substantially monotonically changing signal level during the duration of the output pulse.

22. The laser pulse shaping system according to claim 21 wherein said generating means includes second electro-optic modulator, and means for driving said first and second modulators with like electrical signals in a 180 degree phase relationship.

23. The laser pulse shaping system according to claim 6 further comprising means for applying said laser beam to said generating means as an incident input pulse having a certain intensity profile over a certain furation and a certain frequency, and wherein said bandwidth-encoding means includes means for providing a monotonic relationship between the encoded frequency change and time during the duration of the incident input laser pulse.

24. The laser pulse shaping system according to claim 6 wherein said deflection means for spatially spreading said spectral components includes a transmission diffraction grating.

25. A laser pulse shaping system which generates a temporally shaped laser output pulse with a second temporal intensity profile from a bandwidth-encoded laser input pulse of a first temporal intensity profile extending from about 0.1 picoseconds to about 5 nanoseconds in temporal duration, which system comprises first means for spatially spreading spectral components contained within the bandwidth of said laser input pulse, second means for optically mapping in a plane the spread spectral components provided by said first means in correspondence with said first temporal intensity profile of said bandwidth-encoded input pulse, third means for spatially selectively attenuating in said plane selected components of said mapping provided by said second means to provide remaining components, and fourth means for reconstructing from the remaining components of said selectively attenuated pulse the temporalloy shaped output pulse of said second temporal intensity profile.

26. The laser pulse shaping system according to claim 25 wherein said first spatial spreading means includes at least one diffraction grating.

27. The laser pulse shaping system according to claim 25 wherein said second optical means includes a lens with a focal plane.

28. The laser pulse shaping system according to claim 25 wherein said third includes an optical mask having a substantially two-dimensional predetermined pattern comprising zones or regions of differing levels of attenuation and being coextensive with said optical mapping plane.

29. The laser pulse shaping system according to claim 25 wherein said third means is a substantially two-dimensional array of adjacent polarization-inducing liquid crystal elements, each of said elements providing a level of polarization induction in response to an applied electrical signal level, and a polarization analyzer fixedly positioned with respect to the two-dimensional array on the side of the array facing away from the optical mapping means.

30. The laser pulse shaping system according to claim 25 wherein said fourth means includes a lens and a diffraction grating.

31. A laser pulse shaping system which generates a laser output pulse shaped in two orthogonal directions from a bandwidth-encoded laser input pulse, which system comprises first means for spatially spreading spectral components contained within the bandwidth of said laser input pulse in a first direction, second means for optically mapping in a first plane said first-direction spread spectral components, third means for spatially selectively attenuating in said first plane selected components of said first-direction spread spectral components, fourth means for reconstructing from the remaining first-direction components a first-direction shaped laser output pulse, fifth means for spatially spreading spectral components of said first-direction shaped laser output pulse in a second direction orthogonal to that first direction, sixth means for optically mapping in a second plane said second-direction spread spectral components, seventh means for spatially selectively attenuating in said second plane selected components of said second-direction spread spectral components, and eighth means for reconstructing from the remaining second-direction components a laser output pulse shaped in said second direction and in said first direction.

32. The laser pulse shaping system according to claim 31 wherein said first and said fifth spatial spreading means are identical optical diffraction grating with their respective lines of periodicity positioned orthogonally to each other.

33. The laser pulse shaping system according to claim 31 wherein said first-plane an said second-plane optical mapping means are provided by cylindrical lenses, each with a focal plane, with the central axis of the first-plane lens being parallel to the lines of periodicity of the first spatial spreading grating and with central axis of the second-plane lens being parallel to the lines of periodicity of the second spatial spreading grating.

34. The laser pulse shaping system according to claim 31 wherein said third and said seventh spatially selective attenuating means are masks positioned coextensively with the respective focal planes of the first-plane lens and the second-plane lens, and wherein each attenuating means has a substantially two-dimensional predetermined pattern comprising zones or regions of differing levels of attenuation.

35. The laser pulse shaping system according to claim 31 wherein said fourth reconstruction means includes a cylindrical recollimation lens with a central axis parallel to the central axis of the first-plane optical mapping lens, and followed by a diffraction grating identical to said first spatial spreading grating.

36. The laser pulse shaping system according to claim 31 wherein said eighth reconstruction means includes a cylindrical recollimation lens with a central axis parallel to the central axis of the second-plane optical mapping lens, and followed by a diffraction grating identical to said fifth spatial spreading grating.

* * * * *